XXX

United States Patent
Agarwal et al.

(10) Patent No.: US 9,472,832 B2
(45) Date of Patent: Oct. 18, 2016

(54) PAPER-BASED LITHIUM-ION BATTERIES

(71) Applicant: Indiana University Research and Technology Corp., Indianapolis, IN (US)

(72) Inventors: Mangilal Agarwal, Indianapolis, IN (US); Khodadad Varahramyan, Indianapolis, IN (US); Sudhir Shrestha, Indianapolis, IN (US); Nojan Aliahmad, Indianapolis, IN (US)

(73) Assignee: Indiana University Research and Technology Corporation, Indianapolis, IN (US)

( * ) Notice: Subject to any disclaimer, the term of this patent is extended or adjusted under 35 U.S.C. 154(b) by 0 days.

(21) Appl. No.: 15/004,166

(22) Filed: Jan. 22, 2016

(65) Prior Publication Data

US 2016/0141714 A1    May 19, 2016

Related U.S. Application Data

(63) Continuation of application No. 14/106,759, filed on Dec. 14, 2013, now abandoned.

(60) Provisional application No. 61/737,363, filed on Dec. 14, 2012.

(51) Int. Cl.
| | |
|---|---|
| H01M 4/13 | (2010.01) |
| H01M 10/058 | (2010.01) |
| H01M 4/66 | (2006.01) |
| H01M 10/0525 | (2010.01) |
| H01M 10/0585 | (2010.01) |
| H01M 2/16 | (2006.01) |
| H01M 10/0565 | (2010.01) |
| H01M 4/78 | (2006.01) |

(52) U.S. Cl.
CPC ......... *H01M 10/058* (2013.01); *H01M 2/1626* (2013.01); *H01M 4/663* (2013.01); *H01M 4/666* (2013.01); *H01M 10/0525* (2013.01); *H01M 10/0565* (2013.01); *H01M 10/0585* (2013.01); *H01M 4/78* (2013.01); *H01M 2220/30* (2013.01); *Y02E 60/122* (2013.01); *Y10T 29/4911* (2015.01)

(58) Field of Classification Search
CPC .................... H01M 10/0525; H01M 10/0585; H01M 4/663; H01M 4/78; Y02E 60/122; Y10T 29/4911
See application file for complete search history.

(56) References Cited

U.S. PATENT DOCUMENTS

| | | | | |
|---|---|---|---|---|
| 6,365,300 B1* | 4/2002 | Ota | ....................... | H01M 4/621 429/188 |
| 2008/0124623 A1* | 5/2008 | Hisamitsu | ............... | H01M 4/13 429/156 |
| 2013/0271085 A1* | 10/2013 | Chen | ................... | H01M 4/0445 320/132 |
| 2014/0335418 A1* | 11/2014 | Tamaki | ................... | H01M 4/13 429/231.8 |

\* cited by examiner

*Primary Examiner* — Patrick Ryan
*Assistant Examiner* — Ben Lewis
(74) *Attorney, Agent, or Firm* — C. John Brannon; Brannon Sowers & Cracraft PC

(57) ABSTRACT

A method for fabricating a paper lithium ion cell including depositing a first lithium-metal oxide composition onto a first electrically conducting microfiber paper substrate to define a cathode, depositing a second, different lithium-metal oxide composition onto a second electrically conducting coated microfiber paper substrate to define an anode, separating the cathode and the anode with a barrier material, infusing the cathode and the anode with electrolytes, and encapsulating the anode, the cathode, and the barrier material in a housing.

2 Claims, 18 Drawing Sheets

PAPER-BASED LITHIUM-ION BATTERIES

CROSS-REFERENCE TO RELATED APPLICATIONS

This utility patent application claims priority to the co-pending U.S. patent application Ser. No. 14/106,759, filed on Dec. 14, 2013, which claimed priority to then pending provisional patent application Ser. No. 61/737,363, filed on Dec. 14, 2012, now expired.

TECHNICAL FIELD

The present novel technology generally related to electrochemistry, and more specifically, to batteries.

BACKGROUND

Lithium-Ion batteries are well known in the art. They have been a reliable energy source for many electronics and appliances. Typically, lithium ion batteries have good shelf and cycle life, and thus are used in a wide array of electronics. Their durability and reliability are a primary reason for the mobile use of smartphones and tablets. However, there are drawbacks that come with conventional lithium ion batteries. Lithium-ion batteries are rigid and prone to fracture, which often results in catastrophic failure, fire and even explosions. Lithium ion batteries are typically packaged in stiff metal or plastic casings, add bulk weight. Lithium ion batteries that have been developed with a focus to make them less rigid do so at the expense of durability, cycle life, and reliability; these drawbacks manifest themselves almost immediately. Thus, there is a need for a lithium ion battery that is less prone to brittle fracture and failure, but still remains durable and reliable. The present novel technology addresses this need.

DETAILED DESCRIPTION

Figure 1:
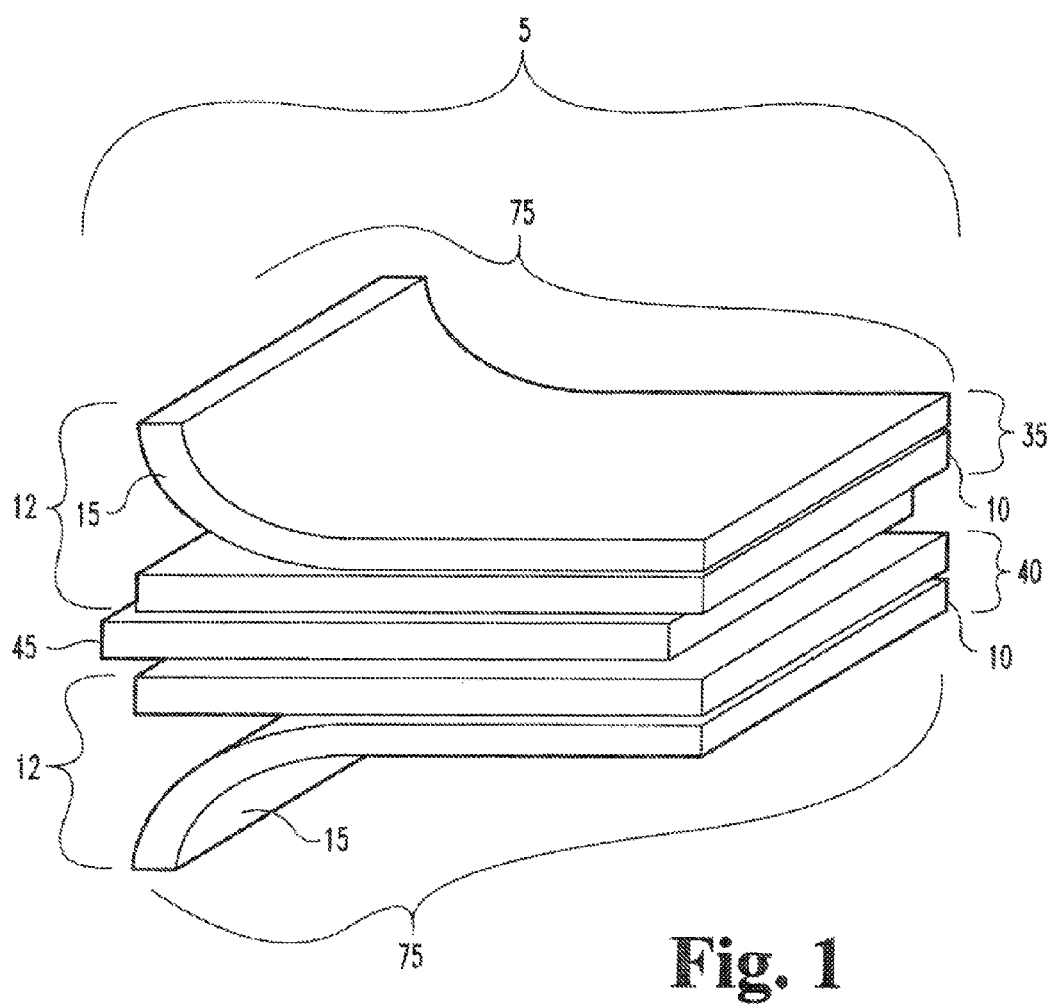
FIG. 1 is a first schematic illustration of one embodiment of the novel technology.

For the purposes of promoting an understanding of the principles of the novel technology and presenting its currently understood best mode of operation, reference will now be made to the embodiments illustrated in the drawings and specific language will be used to describe the same. It will nevertheless be understood that no limitation of the scope of the novel technology is thereby intended, with such alterations and further modifications in the illustrated technology and such further applications of the principles of the novel technology as illustrated therein being contemplated as would normally occur to one skilled in the art to which the novel technology relates.

As illustrated in FIGS. 1-20, the present novel technology relates to a flexible, and typically paper-based lithium electrochemical cell system 5 with flexible electrode layers 10 and flexible, fibrous electrically conducting current collecting substrates 15. Typically, the current collectors 15 are constructed using particulate conductive nanomaterials 20, more typically carbon nanotubes 25, to impregnate or coat wood or cellulosic microfibrous paper 30. The electrode materials are typically lithium-metal oxide compounds, and, more typically lithium cobalt oxide, lithium titanium oxide, lithium magnesium oxide, lithium manganese oxide, combinations thereof and the like. The system 5 typically consists of a first lithium metal oxide cathode 35 and a second, different lithium metal oxide anode 40 (i.e. the electrodes 12) with a dielectric separator 45 interposed between the two. Typically, the electrode materials 15 and the nanomaterial-coated wood microfiber paper-based current collectors 15 experience significantly fewer defects when subjected to repeated bending and/or flexure as compared to the conventional electrode materials deposited on conventional metal current collectors. Thus, the disclosed paper-based electrodes 55 are well suited for flexible battery applications.

Typically, carbon nanotubes (CNT) 25 are used as the conductive nanomaterials 20. Cellulosic or wood microfibers 65 are at least partially coated with CNT (such as through layer-by-layer (LbL) nanoassembly) and processed into electrically conductive paper sheets 60. As shown in FIG. 2A-D, the CNT-impregnated fabricated paper sheets 60 are employed as the current collectors 15 in the cell. Lithium titanium oxide (LTO) and lithium cobalt oxide (LCO) are typically used as respective-electrode materials 10. However, CNT 25 may be replaced with any (typically nanoscale) inorganic or organic conductive materials or combinations thereof, or even combinations of electrically conductive and non-conductive materials. Typically, the electrode materials 15 exhibit higher flexibility when supported by the fabricated paper based current collectors 15. Likewise, LTO and LCO can be replaced with other electrode materials, such as lithium magnesium oxide, lithium manganese oxide, combinations thereof and the like.

Optionally, the microfibers 65 are derived from beaten, bleached softwood microfibers (less than 1% lignin and 99% cellulose). Typically, these typically hollow microfibers are 0.1-100 mm in length, and, more typically, about 0.1-5 mm in length. Typically, these microfibers 65 are between about 1 μm and about 200 μm in diameter, and more typically between about 35 μm and about 200 μlm in diameter.

Typically, cellulosic (paper) fibers 65 are soaked in polyethylene oxide (PEO) solution (1 g/liter) for 5 hours. The soaked fibers are formed into a paper through a filter and press method. It should be noted that while paper is discussed in detail in this embodiment, any flexible fibrous material may be used as a substrate 15.

Optionally, flexible solid electrolytes 70 may replace the separator 45 and be generated from various concentrations and mixtures of an ionic conductive polymer such as: (PEO), polyethylene glycol (PEG), polyvinylidene fluoride, polyvinylidene fluoride-co-hexafluoropropylene) (PVDF-HFP), polymethyl methacrylate, polyacrylonitrile, Polyacrilic acid (compolymers with PEG), PEG methacrylate polymers (PEGMA), or polymer modified emulsions (PME) and the like, and a lithium salt with voltage range typically between about 0.5 volts to 4.5 volts such as lithium hexafluorophosphate (LiPF6),), Lithium bis(Trifluoromethanesulfonyl)imide (LiiTFSii), Lithium perchlorate (LiCL04), Lithium bis (perfluoroethylsulfonyl)imide, Lithium bis(oxatlato)borate, Lithium triflate (LiCF3S04) and lithium-ion conductive glass-ceramics (LiCGC) powder including alumina, silica, titanium oxide (Ti02), and the like as precursors. Solvents, including but not limited to, acetonitrile and n-methyl-2-pyrrolidone (NMP) may be used in order to achieve a solution mixture of various combinations of PEO, LiPF6, and LiCGC powder.

Typically, solid electrolytes 70 may be fabricated using PEO and LiPF6. Typically, 1 g of PEO and 0.4 g of LiPF6 are mixed with 30 ml Acetonitrile solution. Thin solid electrolyte films 10 of the mixture are fabricated through various film fabrication methods such as spin casting, drop casting, spray coating, blade coating, or the like. The films 10 are dried in air and/or vacuum. The thicknesses of such fabricated solid electrolyte films 72 range from about ten micrometers to about five millimeters. However, thinner (to nanometer) or thicker electrolyte films 10 may be fabricated and employed using the disclosed fabrication methods. Alternately, the solid electrolytes 70 may be powdered and dispersed through the electrode portion 10, the current collectors 15, or both.

Optionally, solid electrolytes 70 are fabricated using PEO, LiPF6, and LiCGC powder. A few drops of N-Methyl-2-pyrrolidone (NMP) may be added to 0.4 g of LiPF6 and stirred until completely mixed. The admixture may be added to 40 ml of acetonitrile solution. While stirring, 0.1 g of LiCGC powder may be added. Stirring is continued until a uniform mixture is achieved. Further, 1 g of PEO may be added and stirred until a uniform mixture is formed. Thin films of the mixture are fabricated through various film fabrication methods such as spin casting, drop casting, spray coating, blade coating, or the like. The films may be dried in air and/or vacuum. The thicknesses of such fabricated solid electrolyte films range from ten micrometers to five millimeters. However, thinner (to nanometer) or thicker electrolyte films 10 can be fabricated and employed using the disclosed fabrication methods.

The lithium metal oxide electrode portions 10 may be fabricated by any one of a variety of methods. In one embodiment, pastes of the electrode materials 10 are prepared using 85% (wt) active materials (lithium titanium oxide (Li4Tis0n LTO) or lithium cobalt oxide (LiCo02 or LCO)), 10% (wt) conductive carbon black compounds such as carbon black, conductive carbon black and the like, and 5% (wt) polyvinylidene fluoride (PVDF). It may be possible to increase the conductivity of the electrode paste while PVDF diluted in N-methyl-2 pyrrolidone (NMP) may improve adherence of the materials to the substrate. Each of the electrode materials (LTO, LCO, and the like) may then be separately coated on at least partially electrically conductive current collectors using such methods as, spray coating, spin casting, drop casting and blade coating, typically followed by vacuum drying. Generally, the metal oxide coated current collectors are dried in vacuum for about 12 hours.

In one embodiment, a battery 5 is prepared with half-cells includes lithium foil as the anode 40 and aluminum or conductive paper covered with the LiMm04 as the cathode 35. The conductive paper 60 is prepared by applying a few layers of single wall carbon nanotube 25 with over the cellulose wood fibers 30, such as by a layer-by-layer process. After fabrication of the conductive paper 60 a layer of active material 10 is deposited such as by a spray-coating technique. LiMm04 (85%) is mixed with a conductive carbon black compound and KS6 (10%) and pPolyvinylidene fluoride (5%) to form a paste of active material. 1-methyl-2-pyrrolidone was used as the solvent for the active material mixture The mixture is coated both on the conductive paper 60 and aluminum substrates. The coated electrodes 12 are dried in an oven for 5-6 hours at 60° C. and then transferred to an argon field glovebox. The electrodes 12 are cut in circles with diameter of ⅜ inch to fit in a coin cell. LiPF6 in EC/DEC solvent (1:1 vol) is used as an electrolyte. A polymer dielectric member is used as a separator 45, and positioned in between of the lithium foil and the cathode material to form half-cells. The cell may be stabilized for about 12 hours.

One typical battery 5 configuration of the present novel technology is shown in FIG. 1. The electrodes 12 (LTO or LCO deposited on nanomaterial-coated microfiber paper) are cut in circular samples. Typically, a diameter of between about 0.1 inches to about 0.5 inch is used, and more typically, a diameter of about 0.23 inch diameter is used. The electrodes 12 define the anode 40 and cathode 35 of the battery 5. A polymer separator film 45 divides the anode 40 and cathode 35 of the battery 5. Typically, a dielectric separator 45 is used to separate the cathode portion 35 and the anode portion 40, more typically, a polymer separator is used. The outer surfaces of the current collectors 15 are connected in electric communication to the output of the battery 5. The device assembly is typically soaked in electrolyte solution and packaged. In this example, the battery assembly 5 is soaked in lithium phosphorous fluoride (LiPF6) 1M in an ethylene carbonate/diethyl carbonate (EC/DEC) electrolyte solution (1:1 by volume), pressed, and encapsulated in a coin cell. Alternately, the battery 5 may be separately packaged into a pouch cell. Any convenient form of flexible or rigid packaging methods for the battery 5 may be utilized. The capacities of the batteries 5 made with the current collectors 15 may be measured to be 150 mAh/g for lithium cobalt oxide (LCO) half-celt 158 mAh/g for lithium titanium oxide (LTO) half-cell and 126 mAh/g for the full-cell.

Flexible electrochemical device 5 typically does not appreciably deteriorate or lose efficiency due to bending. In some embodiments, a fibrous material 30 is infused with an at least partially electrically conductive nanomaterial 20 to define a current collector 15. The resultant combination may be coated or deposited with a lithium metal oxide electrode portion 10, or the like to define an electrode 12. At least two of these fabricated electrodes with different lithium metal oxide coatings may be separated by a dielectric separator 45 to define a battery. An electrolyte 70 may be dispersed or infused in the lithium metal oxide electrode portion 10 and/or the fibrous nanomaterial current collector 15. The electrolyte 70 may be a solid or liquid. Some of the demonstrated benefits of the novel system are detailed in the following examples.

EXAMPLE 1

Figure 2A:
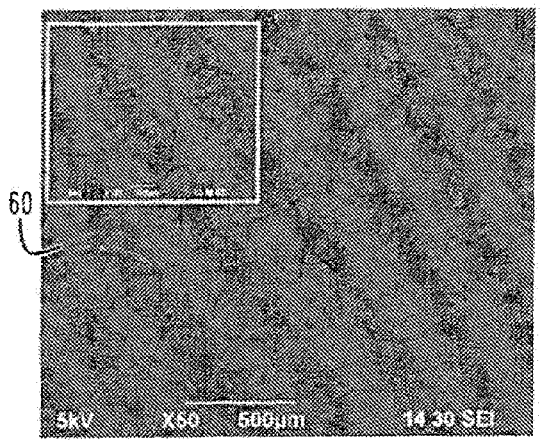
FIGS. 2 A-D is a photomicrograph of the lithium metal oxide materials on the CNT-fabricated paper substrates, according to the embodiment of FIG. 1.
Figure 2B:
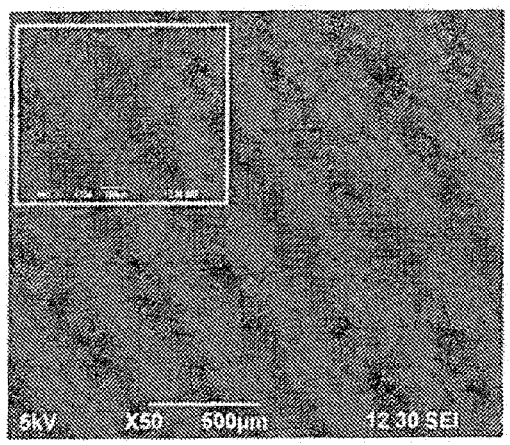
Figure 2C:
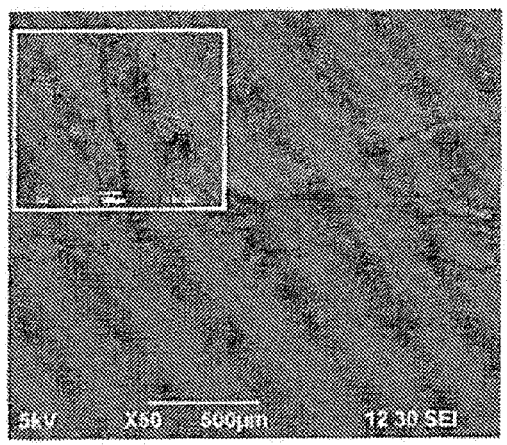
Figure 2D:
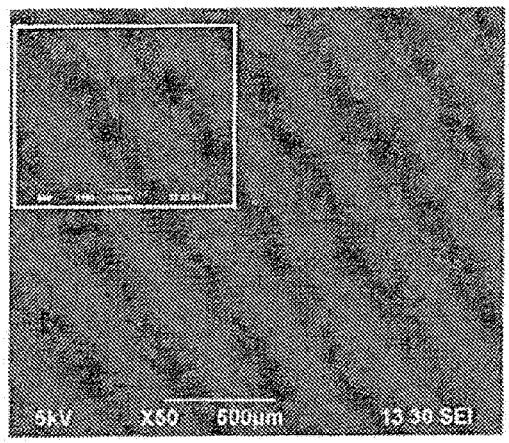

A battery system was prepared as detailed above. The electrodes were studied under SEM after repeated bending. In one study, LCO and LTO were coated on two separate CNT-microfiber paper samples. After vacuum drying the samples for 12 hours, they were bent repeatedly to a 300 degree angle 20 times. The SEM images of the resulting samples are shown in FIGS. 2A (LCO) and 2B (LTO). For comparison, a similar test was conducted on samples prepared from aluminum and copper foils. These SEM images are shown in FIGS. 2C (LCO on aluminum (AI)) and 2D (LTO on copper (Cu)). The insets of the figures highlight areas with observed surface fractures. These images reveal that the electrode material layers on AI and Cu foils suffer from deep fractures over large areas. In comparison, defects on the electrode material coated on microfiber current collectors are relatively shallow and isolated to a small area. Furthermore, some parts of the active materials over the AI and Cu foils are detached from the surface, introducing gaps under the active material layer. In contrast, no such effects were observed with CNT-microfiber paper current collectors. Although the surface has some fractures, the porous structure of the paper acts to keep the electrode material on the substrate, thus preventing the detachment of active material from the current collector.

LTO and LCO half-cells with CNT-microfiber paper current collectors were tested between 0.5 and 1.8 V and 3.5 to 4.3 V, respectively. The charging capacity of the LCO half-cell was measured to be 150 mAh/g and the discharging capacity of the LTO half-cell was measured to be 158 mAh/g at a Cj5 current rate (the term C specifies that the charging cycle for the cell takes 5 hours with the given current). This capacity is comparable with the equivalent device fabricated from AI and Cu current collectors and tested under the same conditions. The results show the developed cells are stable with a less than 1% drop in capacity from the first to the 15th cycle.

Full-cells with LTO and LCO electrodes on CNT-microfiber paper current collectors were tested for charging/discharging performance between 1.2 V and 2.7 V. The maximum charging capacity was measured 126 mAh/gat a C/5 current rate. Further tests were conducted with higher C rates and the charging capacities were measured to be 112 mAh/g for C/2.5 and 107 mAh/g for C. The internal resistances of full-cells were measured to be 2.8 O for paper-based and 1.95 O for metallic current collectors. It was also observed that, after 25 cycles, the charging capacity of the batteries dropped by approximately 15%, mostly caused by the drop at the first charging cycle and attributed to the stabilization of the cell. A similar drop was observed on the first cycle in the devices with metallic current collectors. The cell performance was observed to be stable after the first cycle.

The columbic efficiency of the battery was measured 84% for the first cycle, which increased to 96% in the second cycle and stayed between 96-98% thereafter. This is attributed to the fact that in the first cycle the charging takes place between 0 and 2.7 V while in the following cycles the discharge voltage is limited to 1 V, resulting in a higher charging time and lower discharging time in the first cycle. After the first cycle, the battery reaches a stable state. Self-discharge results of the full-cell charged to 2.7 V at C/5 current rate was tested. After 90 hours the battery output voltage was stable at 2 V.

EXAMPLE 2

Figure 19:
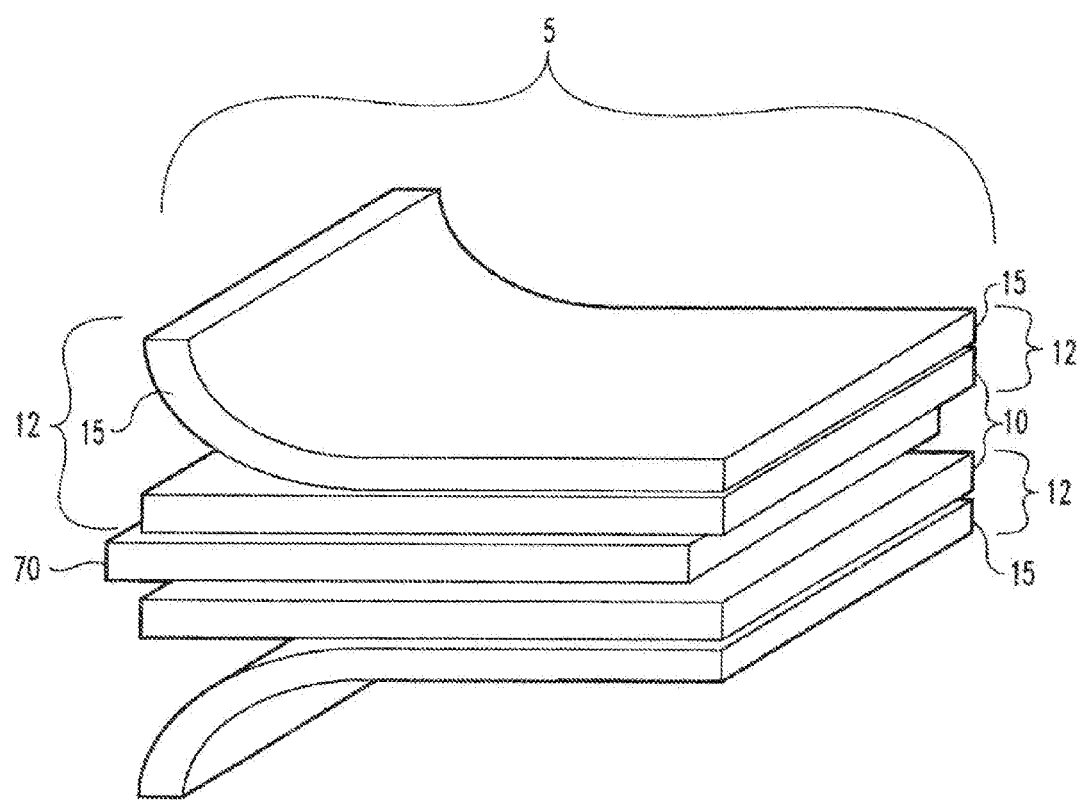
FIG. 19 is a partially exploded perspective view of a second embodiment the novel technology.

Polyimide-polyethylene oxide/lithium hexafluorophosphate (PEO/LiPF6) solid electrolyte, and flexible solid electrolyte batteries were tested. Various methods of solid electrolyte fabrication using various concentration mixtures of PEO and LiPF6 were explored. One embodiment of a battery configuration with the solid electrolyte is shown in FIG. 19.

In one exemplary fabrication of PEO/LiPF6 solid electrolyte, 1 g of PEO and 0.4 g of LiPF6 were mixed to yield an admixture, which was then further ground with the help of mortar and pestle. The admixture was mixed in 30 ml acetonitrile solution. The solution was then stirred for 12 hours. At first the mixture was stirred at higher speed which was then slowed to prevent formation of air bubbles. Thin solid electrolyte films of the mixture were fabricated through various film fabrication methods such as spin casting, drop casting, and blade coating. The films were dried in air and in vacuum. The thicknesses of such fabricated solid electrolyte films ranged from 10 micrometers to 5 millimeters. However, thinner (to nanometer) or thicker electrolyte films can be fabricated and employed using the disclosed fabrication methods.

Figure 3:
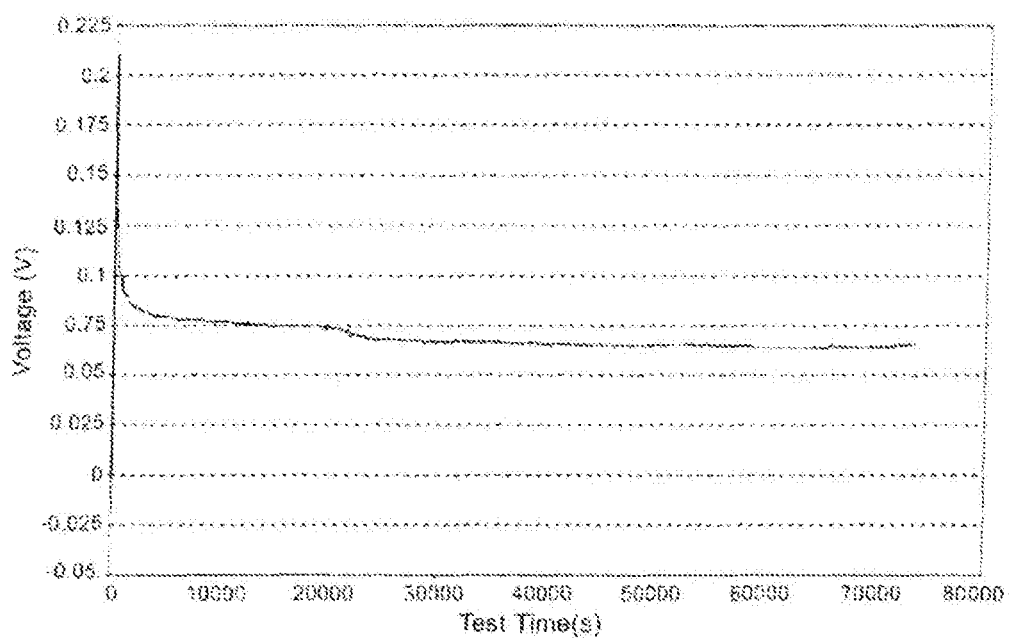
FIG. 3 is a charging curve for Polyimide-polyethylene oxide/lithium hexafluorophosphate (PEO/LiPF6) solid electrolyte battery test, for the embodiment of FIG. 1.

The so-produced solid electrolytes may be used to fabricate batteries using appropriate electrode materials and battery assembly. In one example, batteries with LTO or LCO (or both) electrodes and PEO/LiPF6 electrolyte were fabricated and tested. FIG. 3 shows the charging curve of one such battery.

Figure 4:
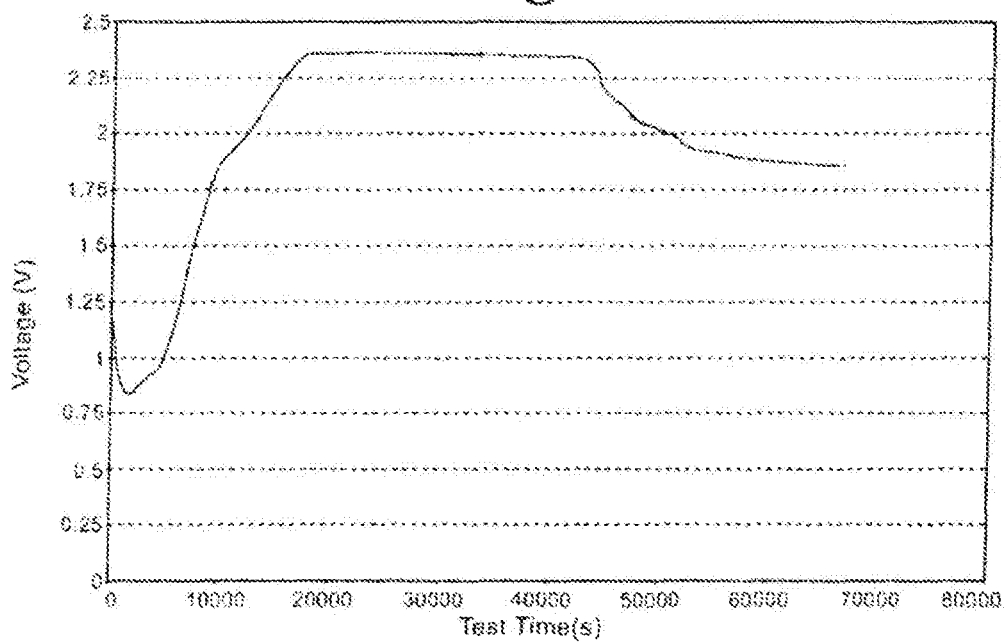
FIG. 4 is a charging curve of the resultant battery when a few drops of liquid electrolyte were added to the PEO/LiPF6 solid electrolyte films of FIG. 1.

In another example a few drops of liquid electrolyte were added to the PEO/LiPF6 solid electrolyte films to improve the performance of the battery. The porous structure of PEO film assists in absorbing and trapping the liquid electrolyte, increasing the ionic conductivity of the gel electrolyte. The charging curve of such a battery is shown in FIG. 4.

EXAMPLE 3

Polyimide-polyethylene oxide/lithium hexafluorophosphatejlithium-ion conductive glass-ceramics (PEO/LiPF6/LiCGC) slid electrolyte and flexible solid electrolyte batteries were produced and examined. Various methods of solid electrolyte fabrication using various concentration mixtures mixtures of PEO, LiPF6 and LiCGC powder, and flexible solid electrolyte batteries were tested.

In one exemplary fabrication of PEO/LiPF6/LiCGC a few drops of N-Methyl-2-pyrrolidone (NMP) were added to 0.4 g of LiPF6 and the mixture was stirred until completely mixed to define an admixture. The admixture was added to 40 ml of acetonitrile solution. While stirring 0.1 g of LiCGC powder was added. Stirring was continued to yield a uniform mixture. One gram of PEO was then added and stirred until a uniform mixture was formed. Thin solid electrolyte films of the mixture were fabricated through various film fabrication methods such as spin casting, drop casting, and blade coating. The films were dried in air and in vacuum. In a further exemplary method the films were fabricated hydrophobic substrate including heat-treated glass and silicon tape for easy peeling off. In another exemplary method the films were dried in an acetonitrile environment to prevent contact with air. The thicknesses of such fabricated solid electrolyte films ranged from 10 micrometers to 5 millimeters. However, thinner (to nanometer) or thicker electrolyte films can be fabricated and employed using the disclosed fabrication methods.

Figure 5:
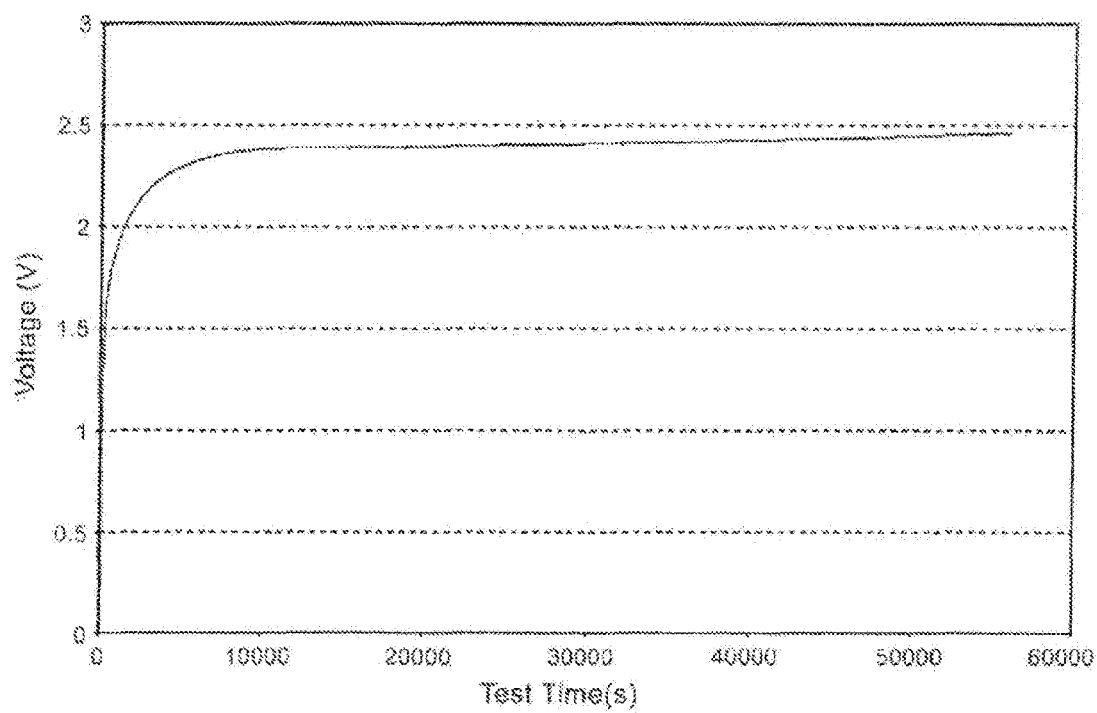
FIG. 5 is graph detailing time vs. voltage of a LTO-PEO/LiPF6/LiCGC (semi-solid)-LCO electrode battery of FIG. 1.

In one example, the PEO/LiPF6/LiCGC electrolyte film was peeled off from the substrate before it was completely dry (semi solid) and it was used in fabrication of solid lithium ion battery devices. Charging curve of such a device is shown in FIG. 5.

Figure 6A:
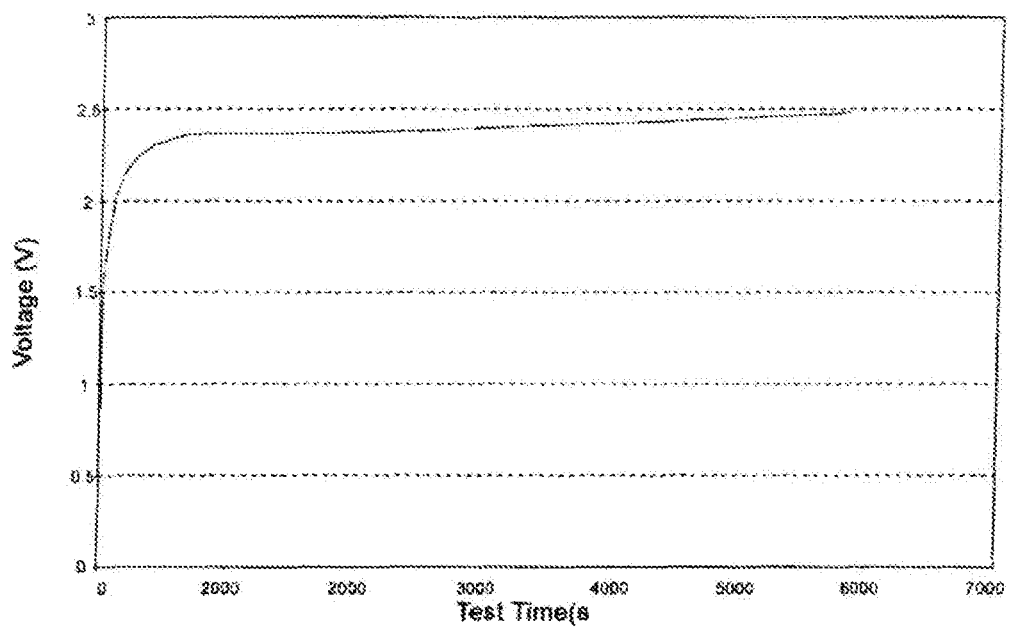
FIGS. 6A-B illustrate a charging curve of a battery when the PEO/LiPF6/LiCGC electrolyte film is dried of FIG. 1.
Figure 6B:
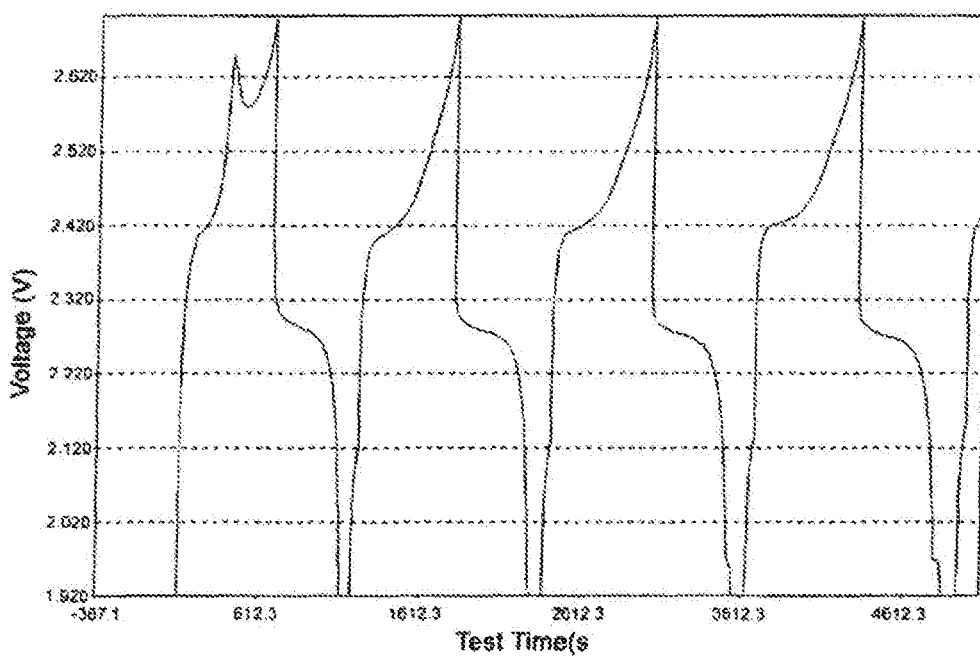

In another method, the PEO/LiPF6/LiCGC electrolyte film was completely dried. The electrolyte film was then used in fabrication of solid lithium ion battery devices. The charging curve of such a device is shown in FIGS. 6A and 6B.

In another exemplary method the electrolyte material was applied on a heat-treated glass substrate. In an exemplary method the substrate was heated at 540° C. for an hour. The heat treatment of the glass substrate makes the surface hydrophobic which improves the peeling process of the dried electrolyte film. This method reduced the fragments in the polymer film and provided better polymer surface.

In another exemplary method the solid electrolyte was dried in an acetonitrile environment. In an exemplary method the solid electrolyte film was dried in a glass desiccator filled with acetonitrile vapor. A better uniformity of the film was achieved.

In another example, the electrolyte film was dried in a vacuum oven. In an exemplary method the electrolyte film was dried at 60° C. for 5 hours. Drying of the film reduces the defects incurred during peeling of the process.

In another example the solid electrolyte films were directly applied on the electrode material layers. In an exemplary method the electrolyte mixture (PEO/LiPF6/LiCGC) was applied directly on the electrode materials and were put together to form a battery device assembly. A better connection of electrolyte and electrode materials was observed.

Figure 7:
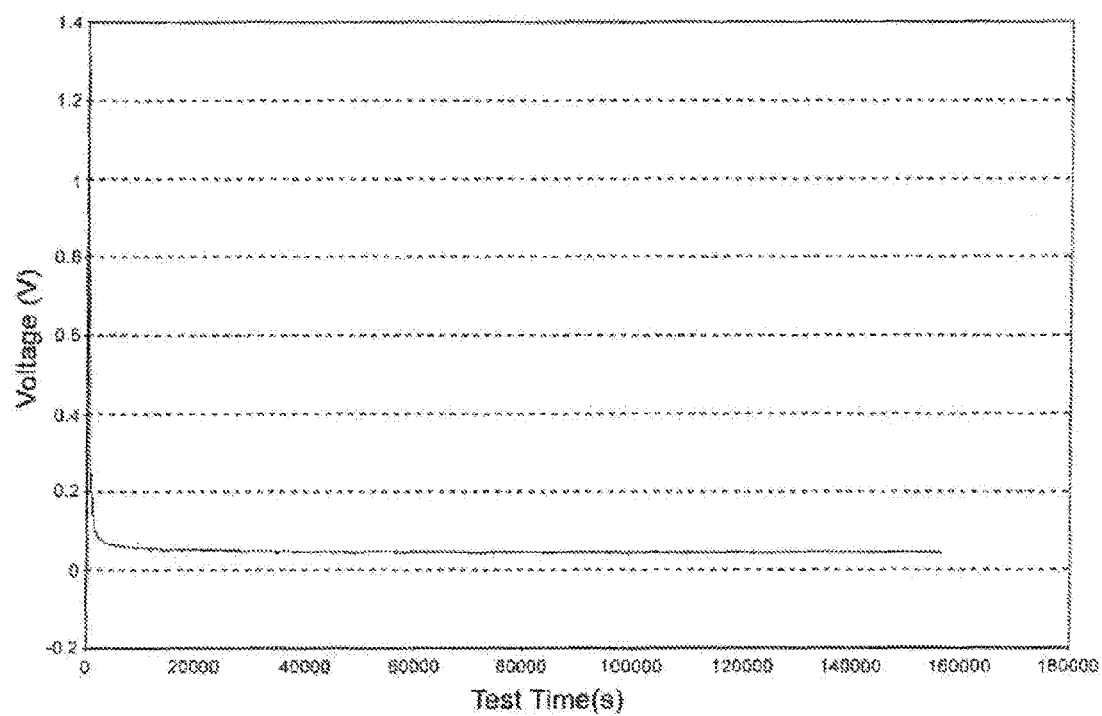
FIG. 7 is a charging curve of LTO-PEO/LiPF6/LiCGC-LCO battery of FIG. 1.

Batteries with the solid electrolyte and paper-based flexible electrodes on nanomaterials-coated wood microfiber current collectors were fabricated and tested. A preliminary exemplary charging curve result is shown in FIG. 7.

One example of coating electrode material on paper-based current collector using blade coating method is disclosed. This process provides thicker electrode layer that help reduce pinch-through shorting problem seen in some battery devices.

Figure 8:
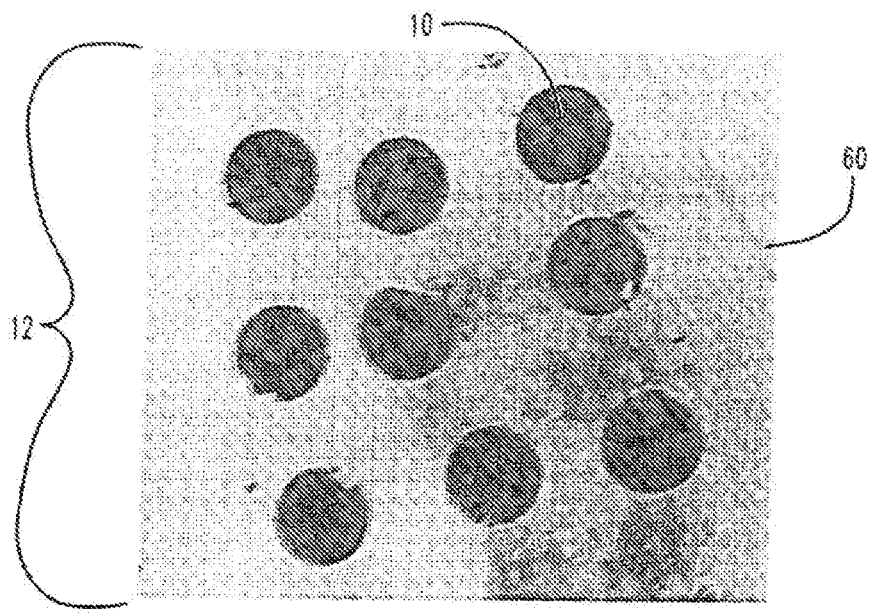
FIG. 8 is a first photomicrograph image of one embodiment of an electrode of the embodiment of FIG. 1.
Figure 9:
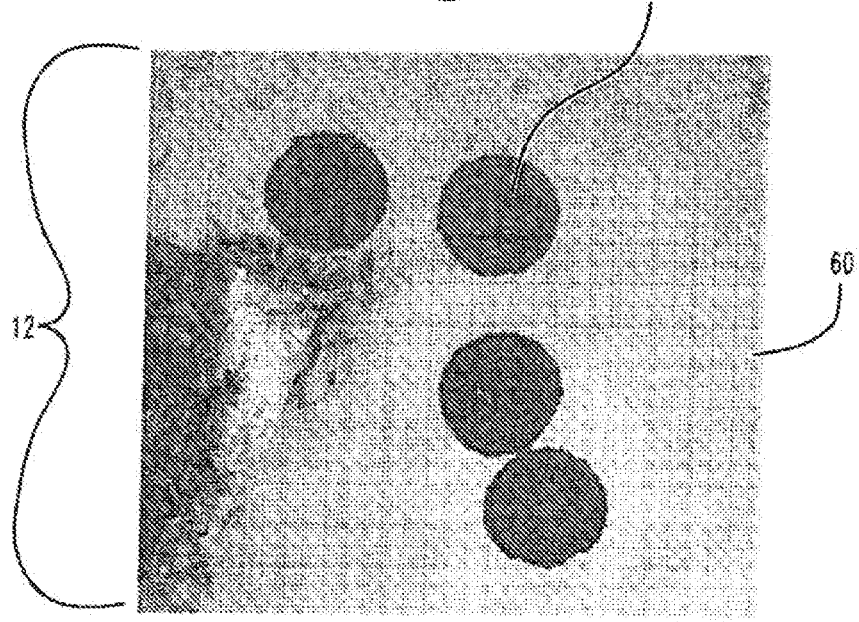
FIG. 9 is a second enlarged photomicrograph of the electrode of FIG. 8.
Figure 10:
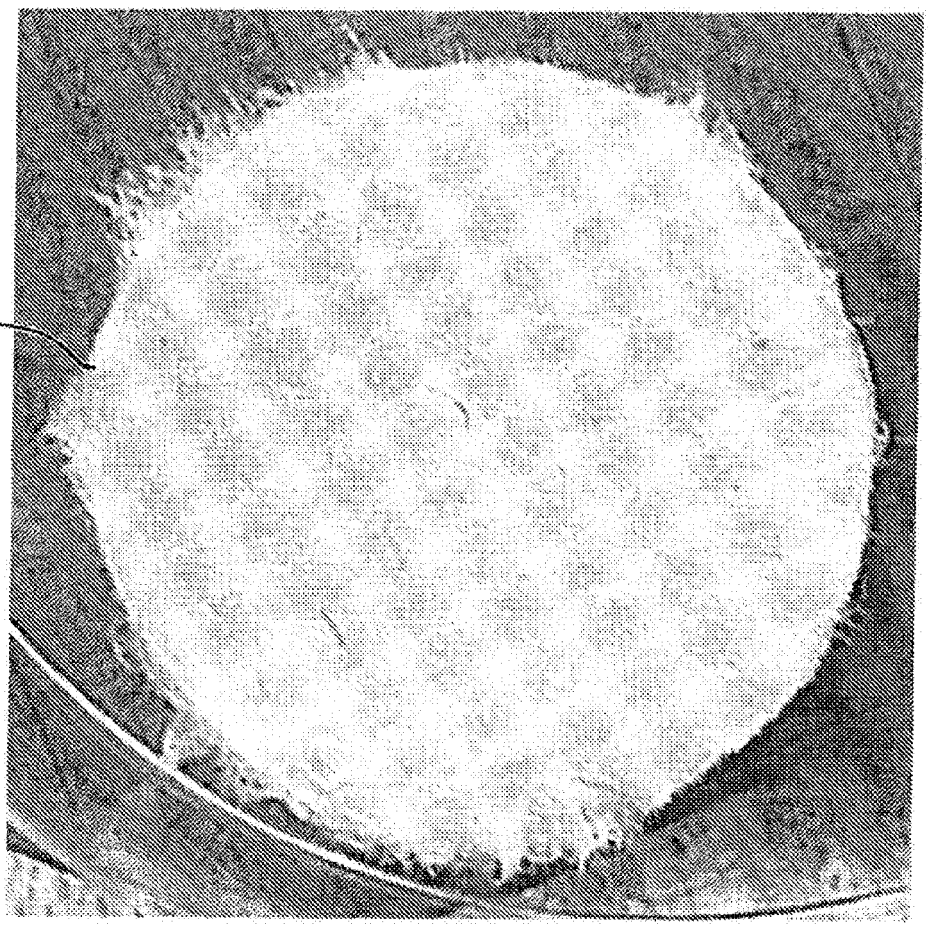
FIG. 10 is a perspective view of one embodiment of the separator, current collector, and electrolyte, of FIG. 1.

In one example, a paste of electrode material with a few drops of solvent was prepared. The amount of active material was also increased by 5% (wt) (to achieve a better surface structure). After mixing the electrode martial with PVDF binder, KS6, and carbon conductive materials in a mortar, a few drops of NMP was added to make a creamy paste. A 1-5 mm thick layer of the paste was deposited on the current collector through blade coating method. In a further exemplary method the samples were dried for 2-3 hours and were heated in a vacuum oven. In an exemplary method aluminum foil current collector was used. The images of the dried and cut samples are shown in FIG. 8. In an exemplary method CNT-coated wood microfiber paper current collector was used, shown in FIG. 9.

In another exemplary method hot press was used to for the cell assembly. In this method a hot press with a temperature between 90-150° C. (slightly lower than melting point of the polymer separator) was used to provide a multilayer structure of the anode/separator-electrolyte/cathode. The use of hot press provides a better integration of different layers of battery and a better attachment between the surface of the polymer electrolyte and active materials. This also leads to lower internal resistance in all-solid-state batteries.

EXAMPLE 4

Figure 20:
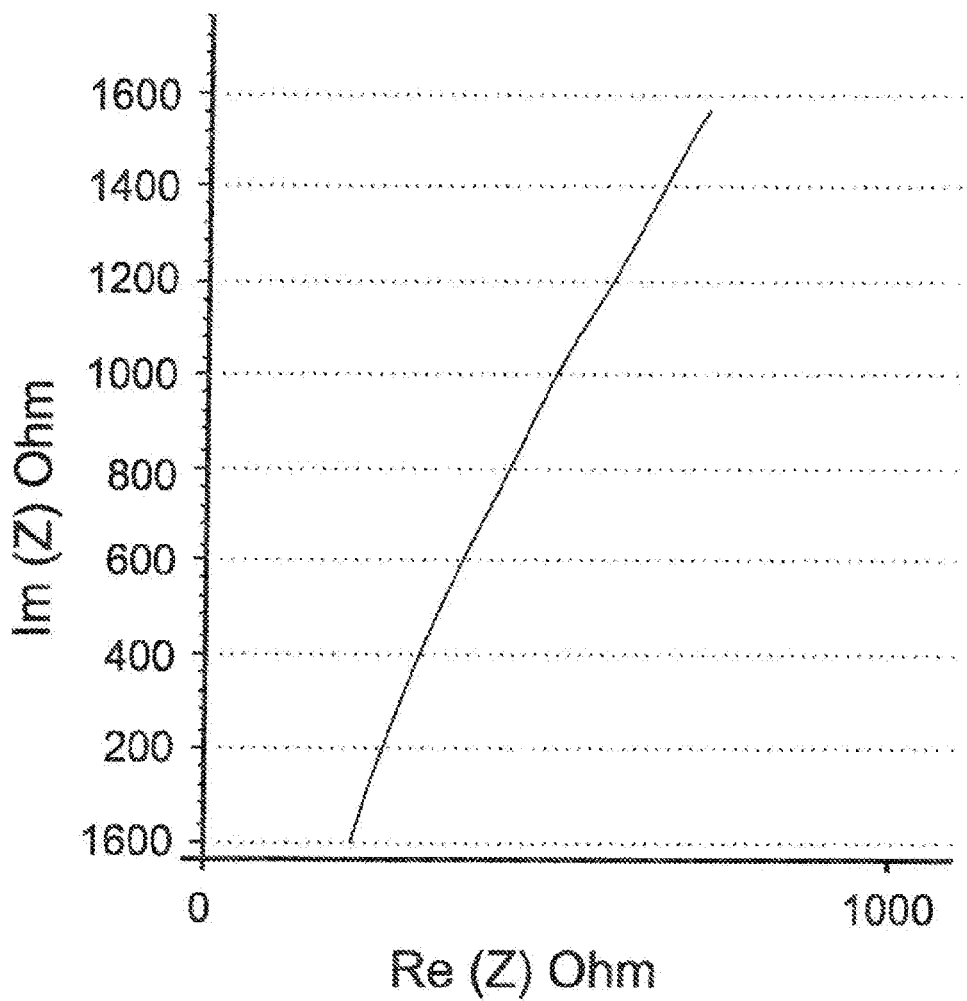
FIG. 20 is a graph of the ionic conductivity of PVDF, PEG, PEO, LiTFSI solid electrolyte mixture of FIG. 1.

Poly(vinylidene fluoride)/poly Ethylene Glycol/polyimide-polyethylene oxide/lithium bis(Trifluoromethanesulfonyl)imide (PVDF,PEG,PEO,LiTFSI) solid electrolyte was also fabricated and tested. The gel electrolytes were produced using 1:1:2 wt. % in 5 ml of acetonitrile solution. The salt was added to the solution and stirred for 12 hours. The mixture was casted using blade-coating method to form a thin membrane. The membrane was dried using ultraviolet light for two hours. It was then transferred to a vacuum oven for a drying process where it was kept for 12 hours at 50° C. The ionic conductivity of the film was measured to be $10^{-5}$ S-cm, as shown in FIG. 20.

In another exemplary method a solid electrolyte was prepared using an ionic conductive polymer such as polyvinylidene fluoride or poly(vinylidene fluoride-co-hexafluoropropylene) and a lithium salt such as lithium bis(Trifluoromethanesulfonyl)imide (LiTFSi), lithium trifluoromethanesulfonate (LiTF), or lithium perchlorate (LiCL04). The purpose of the salt is to improve the ionic conductivity of the membrane. To further enhance the ionic conductivity of the member a filler material such as lithium-ion conductive glass-ceramics (LiCGC) salt or other conductive polymer such as polyethylene glycol (PEG) are also added to the mixture. The filler material improves the ionic conductivity of the film by generating empty spaces in the polymer film which serve as ion traps for the lithium slat. Different concentrations of the fillers and polymers can provide different structures, and thus different ionic conductivities.

EXAMPLE 5

Paper based lithium ion batteries using current collectors made of carbon nanotube infused paper were constructed and tested. The pulp used in the experiments was made from beaten, bleached softwood microfibers (less than 1% lignin and 99% cellulose), press-dried, and shipped in bundles of 17"×14" sheets. These hollow microfibers are 0.1-5 mm in length and 5-200 μm in diameter.

An aqueous dispersion of poly(3A-ethylenedioxythiophene)-poly(styrenesulfonate) (PEDOT-PSS) conductive polymer (3 mg/ml) and carbon nanotubes (25 pg/ml) was used as the anionic component, while poly(ethyleneimine) (PEI) (3 mg/ml) was used as cationic polyelectrolyte component for the LbL coating of the wood microfibers. Coating microfibers with two bi-layers of (PEI/CNT) in alternate with one bi-layer of (PEI/PEDOT-PSS) achieved the desired conductivity. Following CNT-coating, the wood microfibers were assembled into flexible paper sheets (through an in-house setup made in accordance to the Technical Association of Pulp and Paper (TAAPI) T 205T standard) to be used as current collectors.

Pastes of the electrode materials were prepared using 85% (wt) of the active materials ($Li_4Ti_5O_{12}$ or $LiCoO_2$), 10% (wt) conductive material made from carbon black with a particle size of about 40 nm, and 5% (wt) Polyvinylidene fluoride (PVDF). Conductive carbon black increases the conductivity of the electrode paste while PVDF diluted in N-Methyl-2 Pyrrolidone improves adherence of the material to the substrate [10]-[11]. The electrode materials were then coated on the current collectors by a spray coating method followed by vacuum-drying for 12 hours.

The battery configuration was assembled in an argon filled glove box. The CNT-microfiber paper, coated with lithium titanium oxide (LTO) and lithium cobalt oxide (LCO), are cut in circular samples with diameter of 0.23 inches, which form the anode and cathode of the developed battery. A separator film divides the anode and cathode of the battery. The outer surfaces of the CNT-microfiber current collectors are connected to the output of the battery. The battery assembly was soaked in lithium phosphorous fluoride ($LiPF_6$) 1M in an EC/DEC electrolyte solution (1:1 by volume), pressed, and encapsulated in a Coin cell. After assembly, the devices were kept undisturbed for 24 hours allowing them to reach stable states by completely soaking the electrode materials and the separator with the electrolyte solution. LCO/LTO half-cells and full-cells were tested using a battery testing system.

Figure 11:
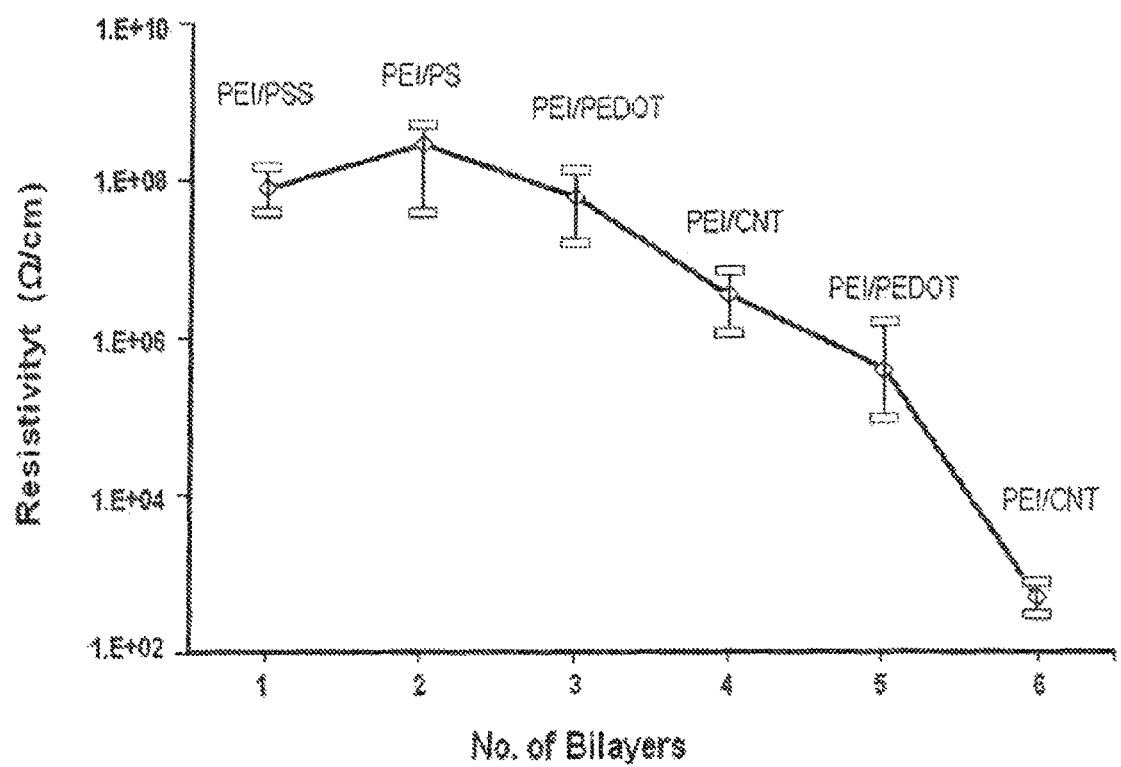
FIG. 11 is a graph of the resistivity wood microfibers measured after coating each deposited bi-layer of polymer CNT of FIG. 1.

The resistivity of the microfibers was measured after each bi-layer coating of PEI/PEDOT-PSS and PEI/CNT in the Lbl nanoassembly process. The measured resistivity results are shown in FIG. 11. The conductivity of fibers is measured using a micro-probing station at 0.5 to 5 V. As expected, results show that resistivity decreased following the addition of each bi-layer of PEI/PEDOT-PSS or PEI/CNT on the microfibers. It was also observed that after a slight increase for PSS/PEI precursor layers, the resistivity of the microfibers decreases exponentially with the addition of PEI/PEDOT-PSS and PEI/CNT bi-layers. A layer of PEDOT-PSS sandwiched between CNT layers forms a thin layer, of about 2 to 5 nm, around the fibers and enhances the electrical characteristics by reducing the resistivity of the coated fiber. This is likely due to the electrical path provided by PEDOT-PSS, which forms a continuous conductive network between CNT on the surface of the wood microfibers. It has previously been shown that the PEDOT-PSS makes conductive joints between CNT-PSS smoother by increasing the clusters. In addition, as CNT is expected to dominate the conductive path, even though PEDOT is known for oxidation, its effect on the conductivity of the paper is minimal.

Figure 12B:
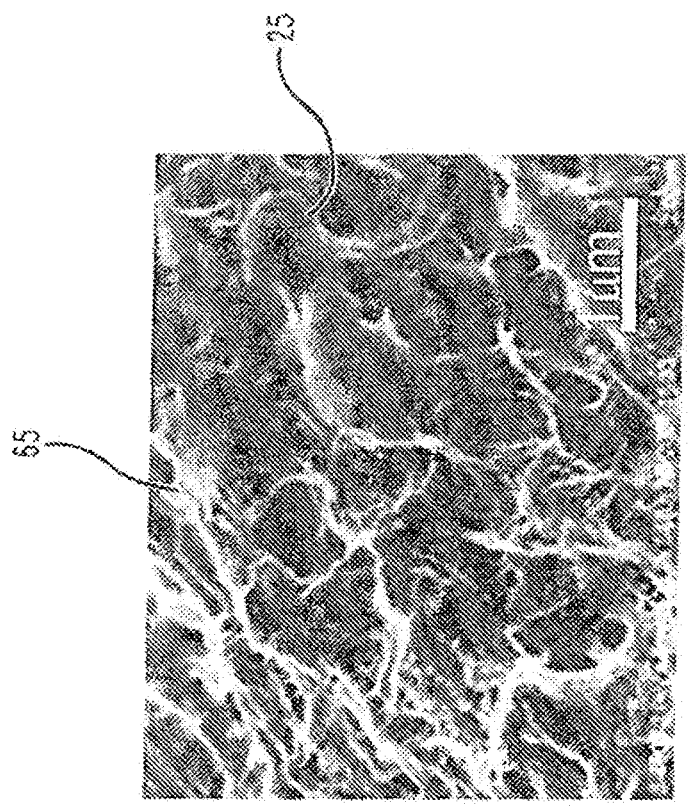
FIG. 12B is a photomicrograph of CNT-coated microfibers of FIG. 1.
Figure 12A:
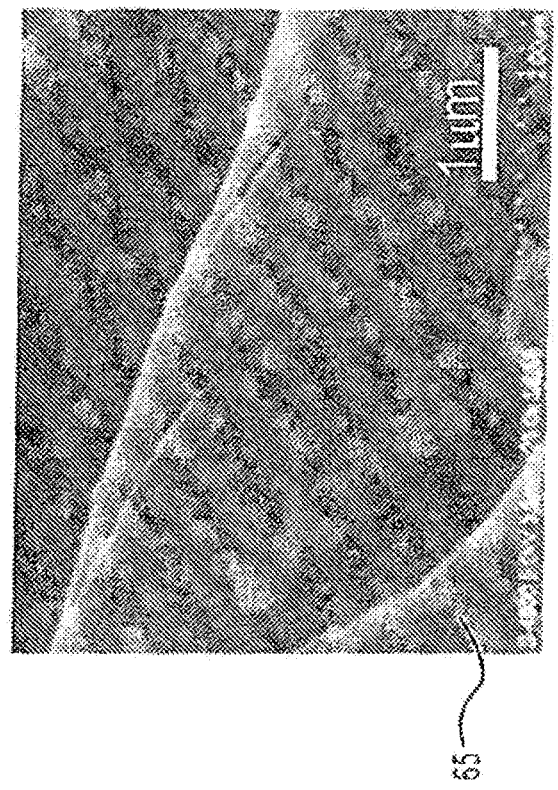
FIG. 12A is a photomicrograph of uncoated micro-fibers of FIG. 1.

SEM images of the uncoated and coated microfibers reveals surface structures, as shown in FIG. 12A-B. FIG. 12A shows the surface of an uncoated microfiber, while FIG. 12B shows the surface of a microfiber coated with two hi-layers of (PEijCNT) in alternate with one bi-layer of (PEI/PEDOT-PSS). The thickness of the paper sheet was measured to be about 50 μm. The resistivity of a CNT-microfiber paper sheet fabricated from these coated wood microfibers was measured to be 1.92 kΩ-cm. The conductivity results show that further improvement is needed for high current applications.

Figure 13A:
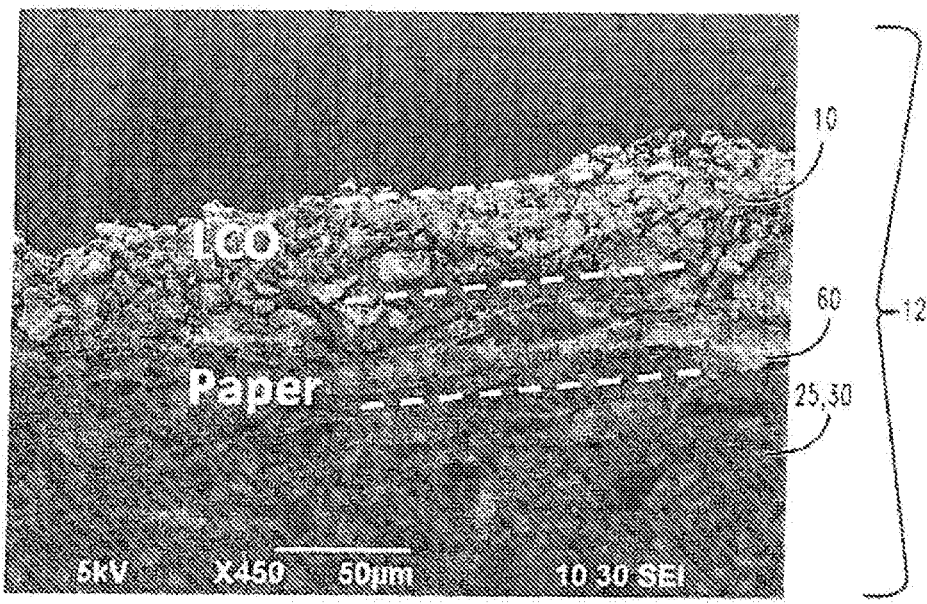
FIGS. 13A-B is a photomicrograph of various embodiments of an electrode of the novel technology of FIG. 1.
Figure 13B:
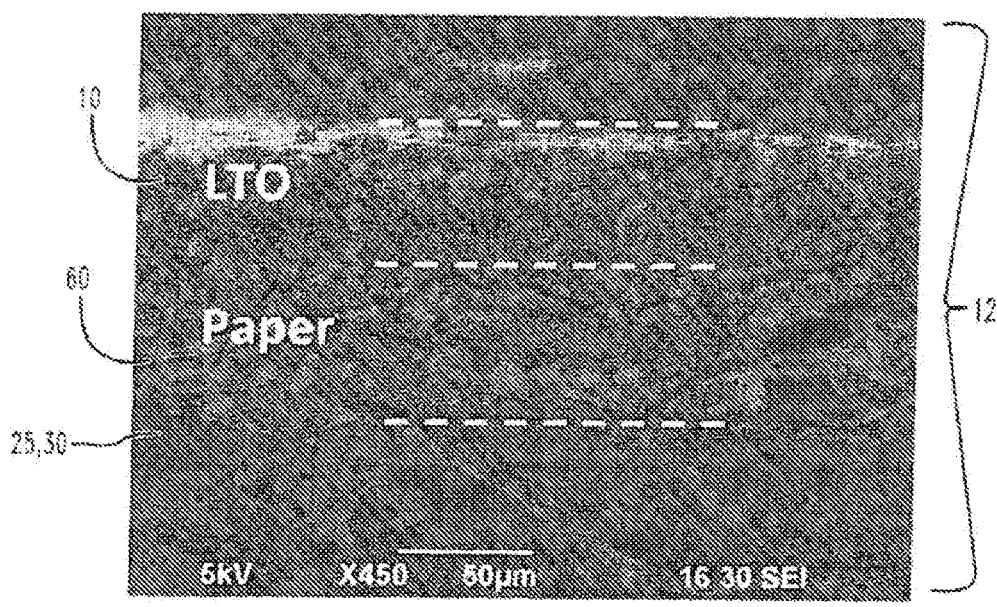

Cross-sectional SEM images of the LCO and LTO coating on CNT-microfiber paper current collectors are presented in FIG. 13A-B. As shown, the electrode material layers (LTO and LCO) that consist of active materials, PVDF, and conductive carbon black, form a solid layer on the top of current collectors. It can also be noted that the CNT-microfiber paper current collector and electrode material layers are discreet with some interpenetration. The latter helps the electrode material layers to be intact on the surface of the developed CNT-microfiber paper current collectors.

The developed paper-based batteries have an inherent flexibility. Therefore, the performance under conditions of repeated bending was studied. In this study, LCO and LTO were coated on two separate CNT-microfiber paper samples. After vacuum-drying the samples for 12 hours, they were bent to a 300 degree angle 20 times. The SEM images of the resulting samples are shown in FIGS. 2A (LCO) and 2B (LTO). For comparison, a similar test was conducted on samples prepared from aluminum and copper foils. These SEM images are shown in FIGS. 2C (LCO on Al) and 2D (LTO on Cu). The insets of the figures highlight areas with observed surface fractures. SEM images reveal that the electrode material layers on Al and Cu foils suffer from deep fractures over large areas. In comparison, fractures on newly developed microfiber current collectors are shallow and contained. Furthermore, some parts of the active materials over the Al and Cu foils are detached from the surface, introducing gaps under the active material layer. In contrast, no such effects were observed with CNT-microfiber paper current collectors. Although the surface has some fractures, the porous structure of the paper, keeps the material on the substrate, preventing the detachment of active material from the current collector.

Standard LTO and LCO half-cells using Cu and Al current collectors were tested between 0.5 V to 1.8 V and 3.5 V to 4.3 V, respectively. It was observed that the charging capacity of the LCO half-cell is 149 mAh/g, and the discharging capacity of the LTO half-cell is 156 mAh/g at C/5.

Figure 14A:
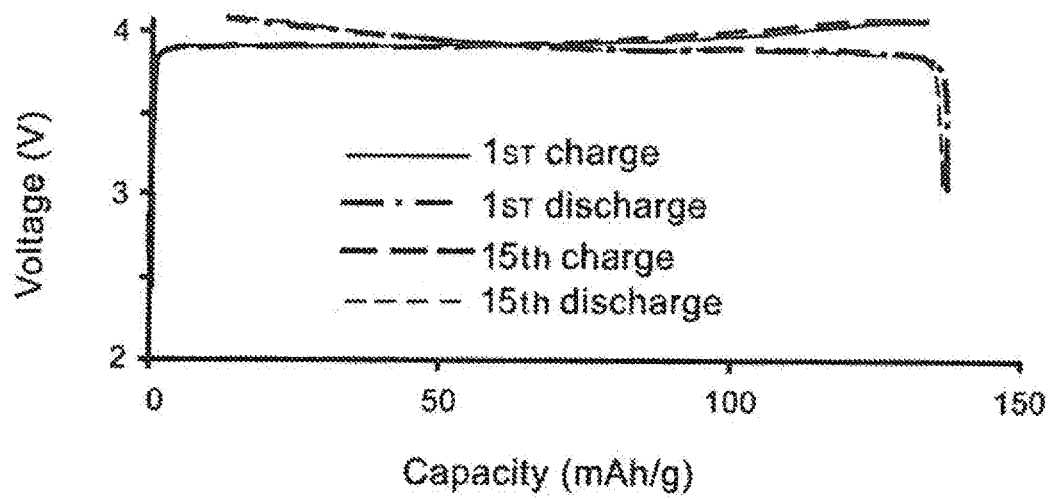
FIGS. 14A-B graphically illustrate galvanostatic charging/discharging curves for various embodiments of the novel technology of FIG. 1.
Figure 14B:
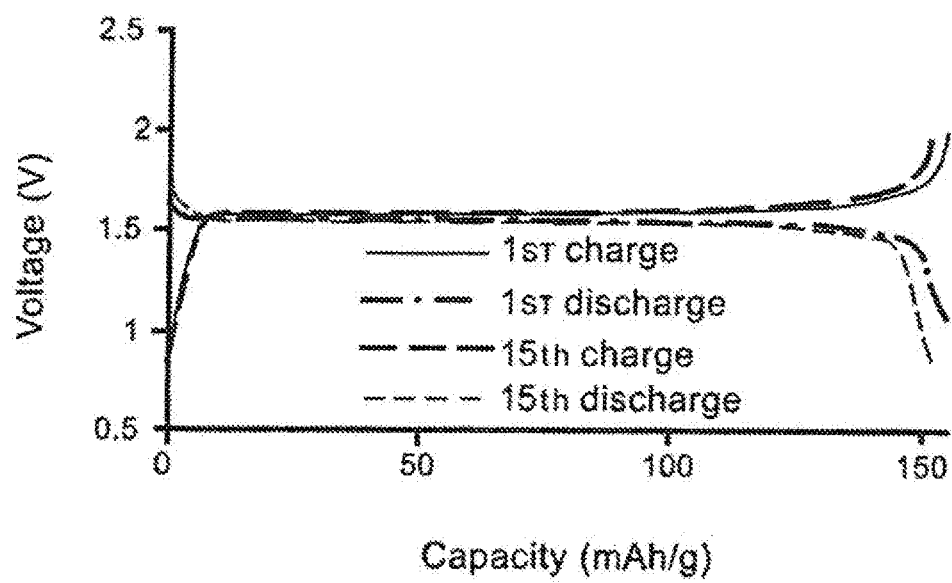

The mass loading of the active materials on the anode (LTO) and cathode (LCO) are 8.8 $mg/cm^2$ and 9.2 $mg/cm^2$, respectively. The CNT mass loading on the current collectors is 10.1 $g/cm^2$. The LTO and LCO half-cells with CNT-microfiber paper current collectors were tested between 0.5 and 1.8 V and 3.5 to 4.3 V, respectively. The charging/discharging capacity curves for LCO and LTO half-cells are shown in FIGS. 14A and 14B, respectively. The performances of the batteries for the first 15 test cycles are presented. It is observed that the charging capacity of the LCO half-cell is 150 mAh/g and the discharging capacity of the LTO half-cell is 158 mAh/g at a C/5 current rate. This capacity is comparable with the equivalent device fabricated from Al and Cu current collectors and tested under the same conditions. The results show the developed cells are stable with a less than 1% drop in capacity from the first to the 15th cycle.

Figure 15A:
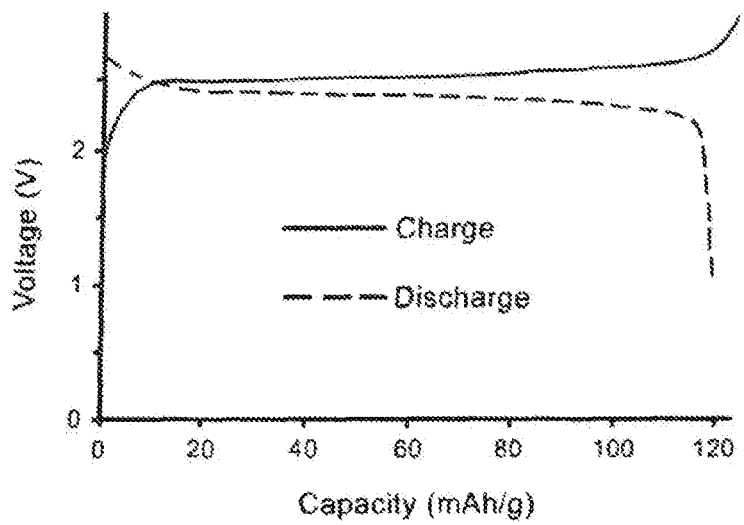
FIG. 15A-B graphically illustrate galvanostatic charging/discharging curves of various embodiments of the novel technology of FIG. 1.

The full-cells with LTO and LCO electrodes on CNT-microfiber paper current collectors were tested for charging/discharging performance between 1.2 V and 2.7 V. The galvanostatic charging/discharging curves and capacity measurements for the first cycle are shown in FIG. 15A. The maximum charging capacity was measured to be 126 mAh/g at a C/5 current rate. Further tests were conducted with higher C rates and the charging capacities were measured to 112 mAh/g for C/2.5 and 107 mAh/g for C. The internal resistances of full-cells measured through a Nyquist plot were observed to be 2.8 Ω for paper-based and 1.95 Ω for metallic current collectors. It was also observed that, after 25 cycles, the charging capacity of the batteries dropped by approximately 15%, mostly caused by the drop at the first charging cycle and attributed to the stabilization of the cell. A similar drop was observed on the first cycle in the devices with metallic current collectors. The cell performance was observed to be stable after the first cycle.

Figure 15B:
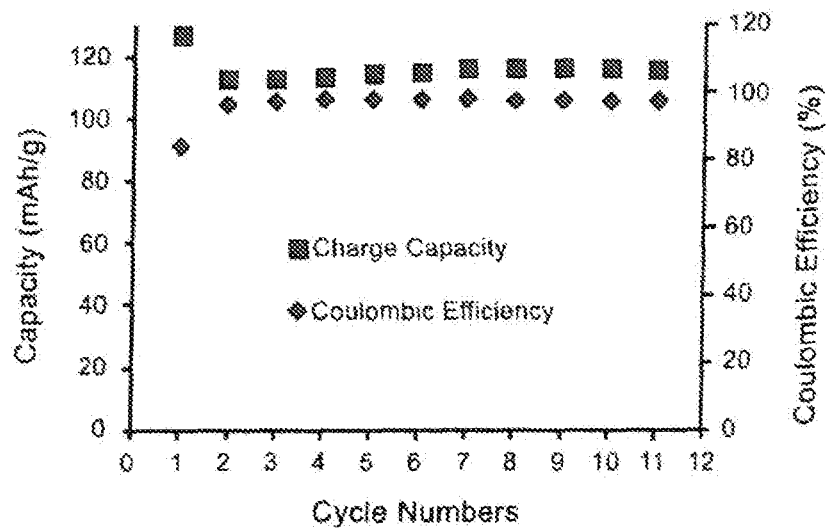
Figure 16:
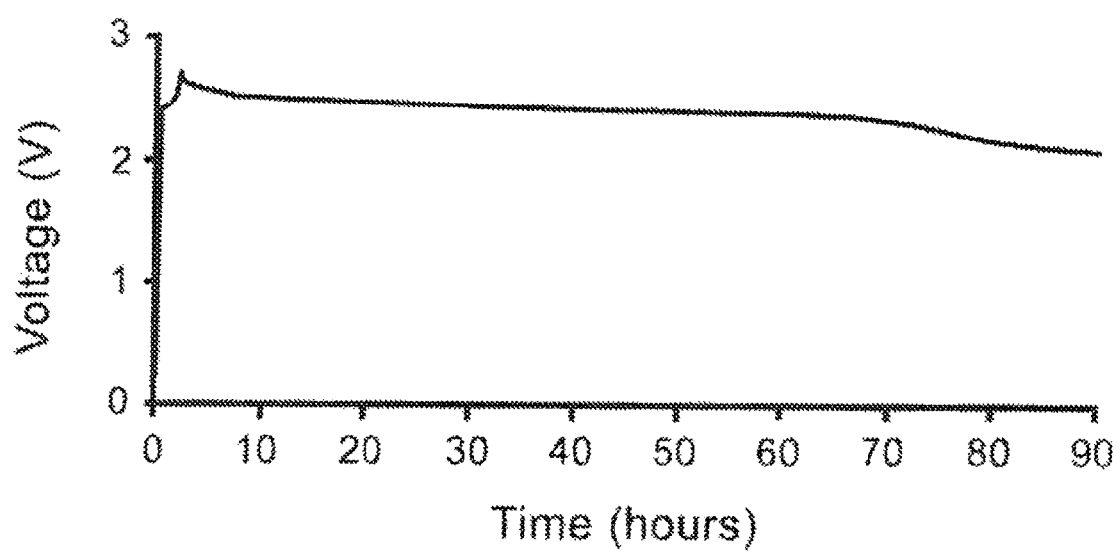
FIG. 16 graphically illustrates self-discharging behavior of one embodiment of the novel technology of FIG. 1.

The columbic efficiency of the battery, as shown in FIG. 15B, was measured to be 84% for the first cycle, which increases to 96% in the second cycle and stays between 96-98% thereafter. This is attributed to the fact that in the first cycle the charging takes place between 0 and 2.7 V while in the following cycles the discharge voltage is limited to 1 V, resulting in a higher charging time and lower discharging time in the first cycle. After the first cycle, the battery reaches a stable state. Self-discharge results of the full-cell charged to 2.7 V at C/5 current rate is shown in FIG. 16. It can be noted that after 90 hours the battery output voltage was stable at 2 V.

EXAMPLE 6

A paper based lithium manganese oxide battery was constructed and tested. The half-cells were made using lithium foil as anode and aluminum or conductive paper covered with the LiMmO4 as the cathode. The conductive paper is prepared by applying a few layers of single wall carbon nanotube with over the cellulose wood fibers through layer-by-layer process. After fabrication of the paper a layer of active material was deposited through spray-coating method. LiMmO4 (85%) was mixed with conductive carbon black and KS6 (10%) and polyvinylidene fluoride (5%) to form a paste of active material. 1-Methyl-2-pyrrolidone was used as the solvent for the active material mixture. This mixture was coated both on the conductive paper and aluminum substrates. The coated electrode was dried oven for 5-6 hours at 60° C. and then transferred to an argon field glovebox. The electrodes were cut in circles with diameter of ⅜ inch to fit in a coin cell. LiPF6 in EC/DEC solvent (1:1 vol) was used as electrolyte. A separator was used as a separator, placed in between of the lithium foil and the cathode material to form half-cells. The cell was allowed to stabilize for 12 hours and was subsequently tested using with a battery testing device.

Figure 17A:
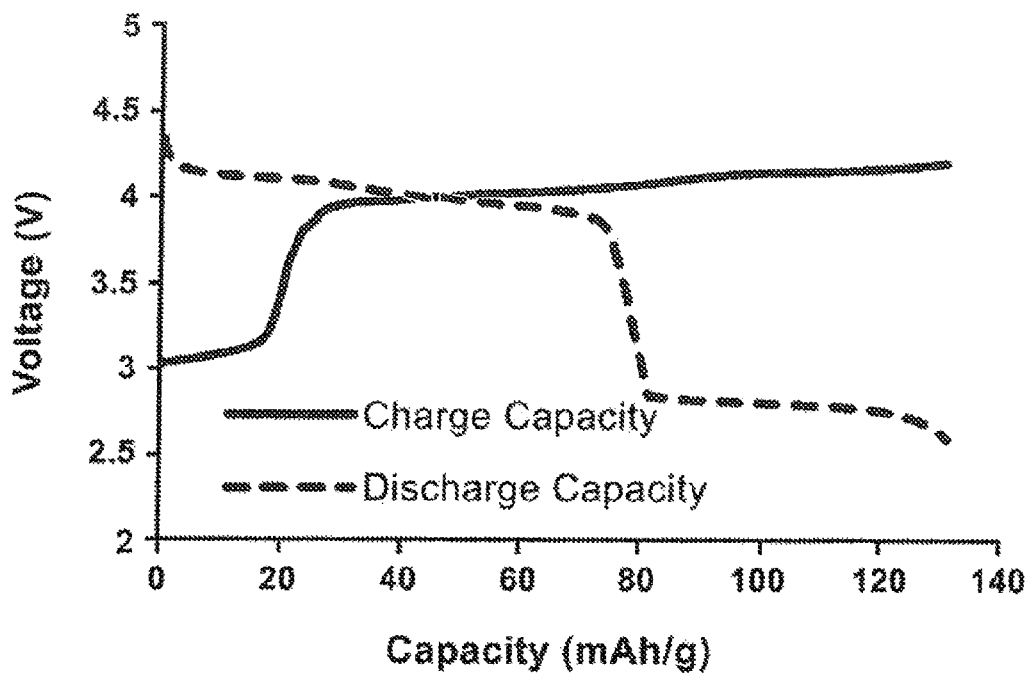
FIGS. 17A-B graphically illustrate galvanostatic charging/discharging curves of various embodiments of the novel technology of FIG. 1.
Figure 17B:
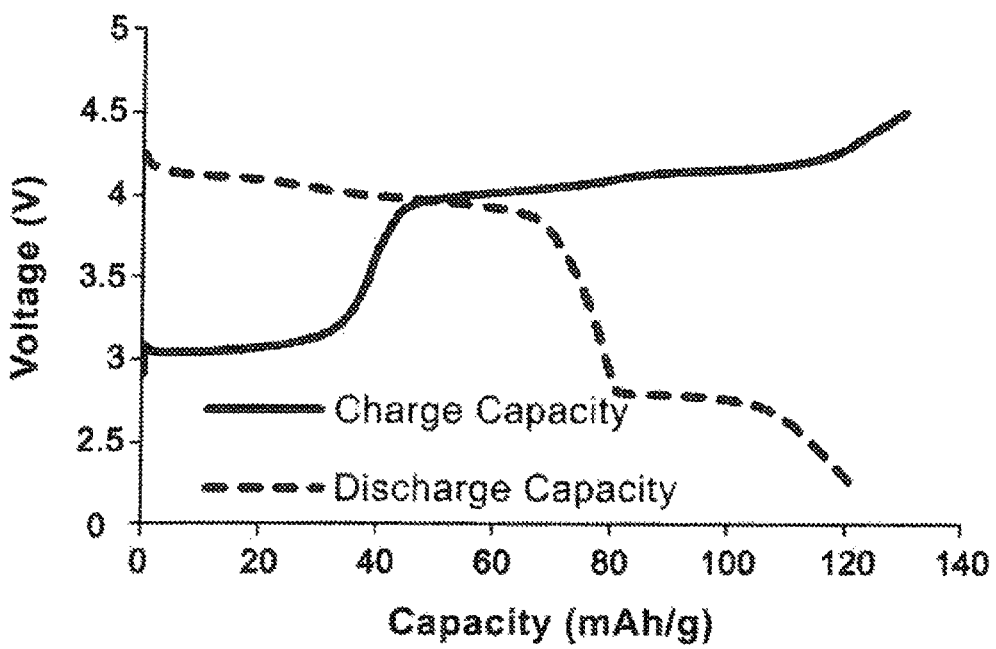

Both aluminum and paper based half-cells were charged between 2.5 V to 4.5 V at 0.2 mA current rate. The galvanostatic charging/discharging capacity results for the paper based and aluminum current collector half-cells, measured separately, are shown in FIGS. 17A and 17B, respectively. The results show that the performance of the battery of paper-based current collector is comparable with the aluminum based device. The results from both the measurements are compared and the charge capacity of paper based half-cell was measured to be 130 mAh/g and for aluminum based half-cell it was measured to be 129.5 mAh/g.

Figure 18A:
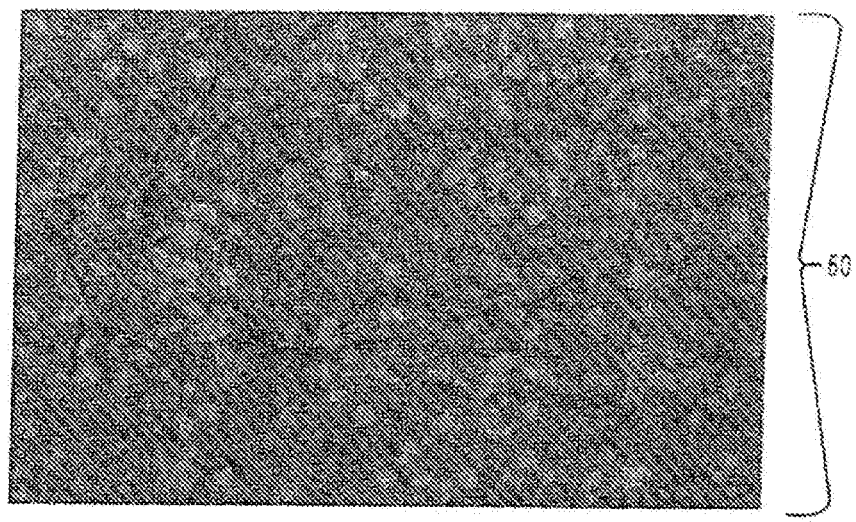
FIGS. 18A-B are photomicrographs of CNT-coated cellulose wood of FIG. 1
Figure 18B:
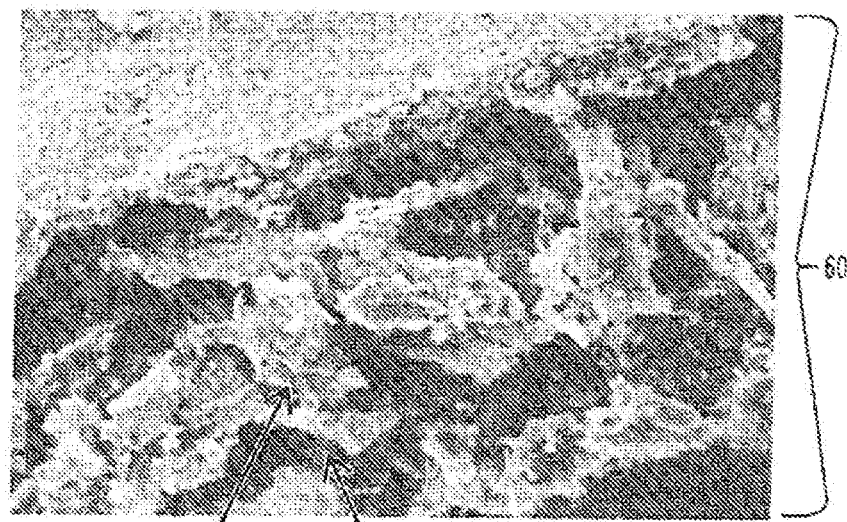

To check the stability of the active materials on the paper current collector, SEM images of the electrodes were taken. FIG. 18A shows the SEM image of active material on the paper current collector. The cross section showing the active material and the coated cellulose wood fiber of the conductive paper current collector is presented in FIG. 18B.

While the novel technology has been illustrated and described in detail in the drawings and foregoing description, the same is to be considered as illustrative and not restrictive in character. It is understood that the embodiments have been shown and described in the foregoing specification in satisfaction of the best mode and enablement requirements. It is understood that one of ordinary skill in the art could readily make a nigh-infinite number of insubstantial changes and modifications to the above-described embodiments and that it would be impractical to attempt to describe all such embodiment variations in the present specification. Accordingly, it is understood that all changes and modifications that come within the spirit of the novel technology are desired to be protected.

What is claimed is:

1. A method for fabricating a paper lithium ion cell comprising:
    a) depositing a first lithium-metal oxide composition onto a first electrically conducting microfiber paper substrate to define a cathode;
    b) depositing a second, different lithium-metal oxide composition onto a second electrically conducting coated microfiber paper substrate to define an anode;
    c) separating the cathode and the anode with a barrier material;
    d) infusing the cathode and the anode with electrolytes; and
    e) encapsulating the anode, the cathode, and the barrier material in a housing;
    wherein the first and second electrically conducting microfiber papers are formed from cellulosic microfibers between about 0.1 mm and about 5 mm in length.

2. A method for fabricating a paper lithium ion cell comprising:
    a) depositing a first lithium-metal oxide composition onto a first electrically conducting microfiber paper substrate to define a cathode;
    b) depositing a second, different lithium-metal oxide composition onto a second electrically conducting coated microfiber paper substrate to define an anode;
    c) separating the cathode and the anode with a barrier material;
    d) infusing the cathode and the anode with electrolytes; and
    e) encapsulating the anode, the cathode, and the barrier material in a housing;
    wherein the first and second electrically conducting microfiber papers are formed from cellulosic microfibers between about 0.1 mm and about 5 mm in length; and
    wherein the microfibers have diameters between about 35 micrometers and about 200 micrometers.

* * * * *